(12) United States Patent
Botzas

(10) Patent No.: US 6,676,524 B1
(45) Date of Patent: Jan. 13, 2004

(54) GAME ENHANCEMENTS VIA WIRELESS PICONET

(75) Inventor: Anthony Botzas, Allentown, PA (US)

(73) Assignee: Agere Systems Inc., Allentown, PA (US)

( * ) Notice: Subject to any disclaimer, the term of this patent is extended or adjusted under 35 U.S.C. 154(b) by 207 days.

(21) Appl. No.: 09/636,456

(22) Filed: Aug. 11, 2000

Related U.S. Application Data

(60) Provisional application No. 60/148,948, filed on Aug. 13, 1999.

(51) Int. Cl.[7] ............... A63F 13/00; G06F 17/00; G06F 19/00
(52) U.S. Cl. ............... 463/43; 463/39; 463/42
(58) Field of Search ............... 463/42–45, 210, 463/39, 29–31

(56) References Cited

U.S. PATENT DOCUMENTS

| | | | | |
|---|---|---|---|---|
| 5,864,346 A | * | 1/1999 | Yokoi et al. | 345/501 |
| 6,007,428 A | * | 12/1999 | Nishiumi et al. | 463/36 |
| 6,280,327 B1 | * | 8/2001 | Leifer et al. | 345/156 |
| 6,306,036 B1 | * | 10/2001 | Burns et al. | 463/31 |
| 6,371,856 B1 | * | 4/2002 | Niwa | 463/1 |
| 6,386,979 B1 | * | 5/2002 | Ho et al. | 463/43 |
| 6,402,616 B1 | * | 6/2002 | Ogata et al. | 345/156 |
| 6,478,679 B1 | * | 11/2002 | Himoto et al. | 463/36 |

* cited by examiner

Primary Examiner—Michael O'Neill
Assistant Examiner—Julie Brocketti

(57) ABSTRACT

A gaming experience is enhanced by employing a game saver drive that is linked with the other devices involved in the game playing experience via a wireless piconet, and that intelligently saves game status information. This information can be used to resume an in-process game at a future time, or to provide for recovery in the case of inadvertent game interruption, such as system failure or crashing. Thus, a system according to one embodiment of the invention includes a game control unit, a video display device, a user input unit, and a game saver unit. The game saver unit is wirelessly linked to at least one of the game control unit, the video display device and the user input unit, and the game saver unit saves status information regarding an in-process game.

16 Claims, 3 Drawing Sheets

GAME ENHANCEMENTS VIA WIRELESS PICONET

CROSS-REFERENCE TO RELATED APPLICATION

This application claims priority to U.S. Provisional Application 60/148,948, filed Aug. 13, 1999, the entirety of which is incorporated herein by reference.

FIELD OF THE INVENTION

The invention is directed to the field of games, and in particular to computer, internet or television based games, such as interactive or multi-player games.

BACKGROUND OF THE INVENTION

Computer games and television games are common. Many people use devices, such as the Playstation, from Sony, or competing products from Nintendo or Sega, to play an interactive game on a television or other video device. Similar games are also played on stand-alone personal computers, or via the internet. One objective of these games is to provide as real an experience as possible to the players. The embodiments of the present invention provide enhancements to the game playing experience by employing wireless piconet technology, such as according to the Bluetooth standard.

SUMMARY OF THE INVENTION

The gaming experience is enhanced, according to one embodiment according to the invention, by employing a game saver drive that is linked with the other devices involved in the game playing experience via a wireless piconet, and that intelligently saves game status information. This information can be used to resume an in-process game at a future time, or to provide for recovery in the case of inadvertent game interruption, such as system failure or crashing.

The gaming experience is enhanced, according to another embodiment according to the invention, by linking a surround lighting system integrated with surround sound and triggered by signals received over a wireless piconet.

Thus, a system according to one embodiment of the invention includes a game control unit, a video display device, a user input unit, and a game saver unit. The game saver unit is wirelessly linked to at least one of the game control unit, the video display device and the user input unit, and the game saver unit saves status information regarding an in-process game.

In an alternative embodiment, a system according to the invention includes a game control unit, a video display device, a user input unit, and a plurality of lighting units wirelessly linked to at least one of the game control unit, video display device and user input unit, and adapted to illuminate based on game activity. The game activity may include the occurrence of a particular event, such that the illumination of the lighting units affects a perceived realism of the event. This system may also include the game saver unit, such that the game saver unit is adapted to save a game status based on the particular event.

In another alternative embodiment according to the invention, a method of saving a status of an in-process video game includes the steps of determining that a difficult point in the game is imminent, and saving the game status based on the determination. The determination that the difficult point in the game is imminent may be based on previous plays of the game by a current user, or on general usage. According to this embodiment, the user may be permitted to return to the saved status, for example, after a particular event, such as a catastrophic event, occurs within the game.

BRIEF DESCRIPTION OF THE DRAWING

Objects and advantages of the invention will be apparent to one of skill in the art upon review of the following detailed description in light of the drawing, wherein:

DETAILED DESCRIPTION

Figure 1:
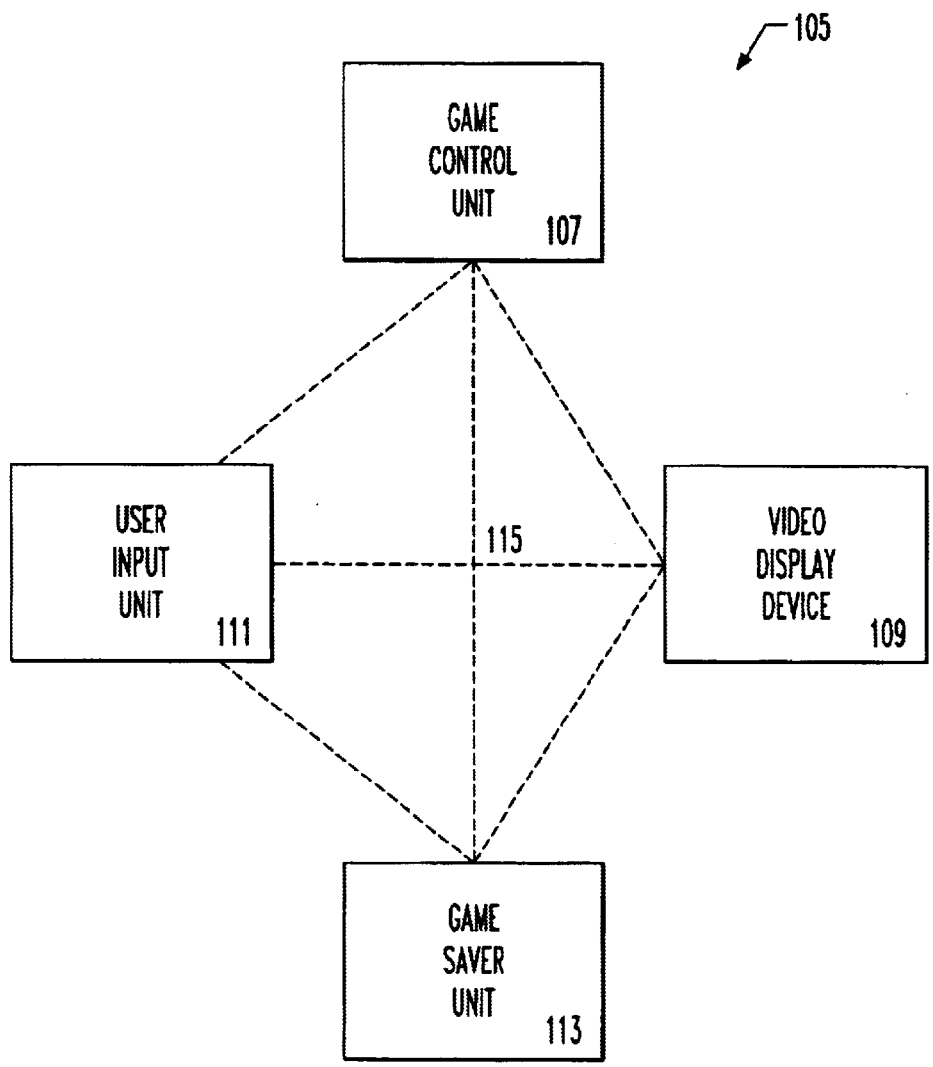

FIG. 1 is a simplified block diagram of a first embodiment of a system according to the invention. Here, system 105 includes a game control unit 107, a video display device 109, a user input unit 111, and a game saver unit 113. These units are shown as separate entities, coupled, for example, via a wireless piconet 115. It is, of course, possible for two or more of these units to be integrated into one complex unit. For example, the video display device 109 may be physically integrated into the game control unit 107.

Each of the units 107, 109, 111 and 113 include a microcontroller or processor, such as an integrated circuit digital signal processor available from Lucent Technologies Microelectronics, to control the functioning of the unit. Such a processor may also serve as a Bluetooth communications processor to enable communications between the units.

The game saver unit 113 is adapted to save status information regarding a game that is in process. This saving may occur based on a trigger from one of the other units. Alternatively, it may occur according to a timetable, such as once every minute, so that a system crash will not require restarting of the game from the beginning. Alternatively, the saving may occur based on the occurrence of an event during the play of the game.

An example of an event that may cause the saving of game status information is the completion of a level within the game, or the upcoming or imminent occurrence of a difficult portion or step of the game. For example, if the user is playing a racing game, and has had difficulty navigating a particular portion of the course without crashing, the game saver unit 113 may save the game status at a point before the particular portion of the course. Thus, if the user crashes again, the system may provide the user with the opportunity to start playing again at a point proximate to the difficult portion. This will allow the user to repeatedly practice the difficult portion until the user learns how to navigate through it. In this case, the fact that the portion is difficult is based on the user's own experience. Alternatively, such a determination may be based on general experience from multiple users or may even be known by the maker of the game so that the game is particularly programmed to trigger game save events at appropriate times.

The use of a racing game is purely by way of example, and not of limitation. Of course, many types of games contain similar challenging moments, either based on general experience, a user's particular experience, or on the actions of others involved in the game. For example, if the game is a battle game, instead of basing the saving event on the user's status or experience, the saving event may be based on an opponent's status or experience. Thus, for example, if an opponent becomes more powerful, such that the user is more likely to face a critical point where catastrophe is likely, then a saving event may take place.

Figure 2:
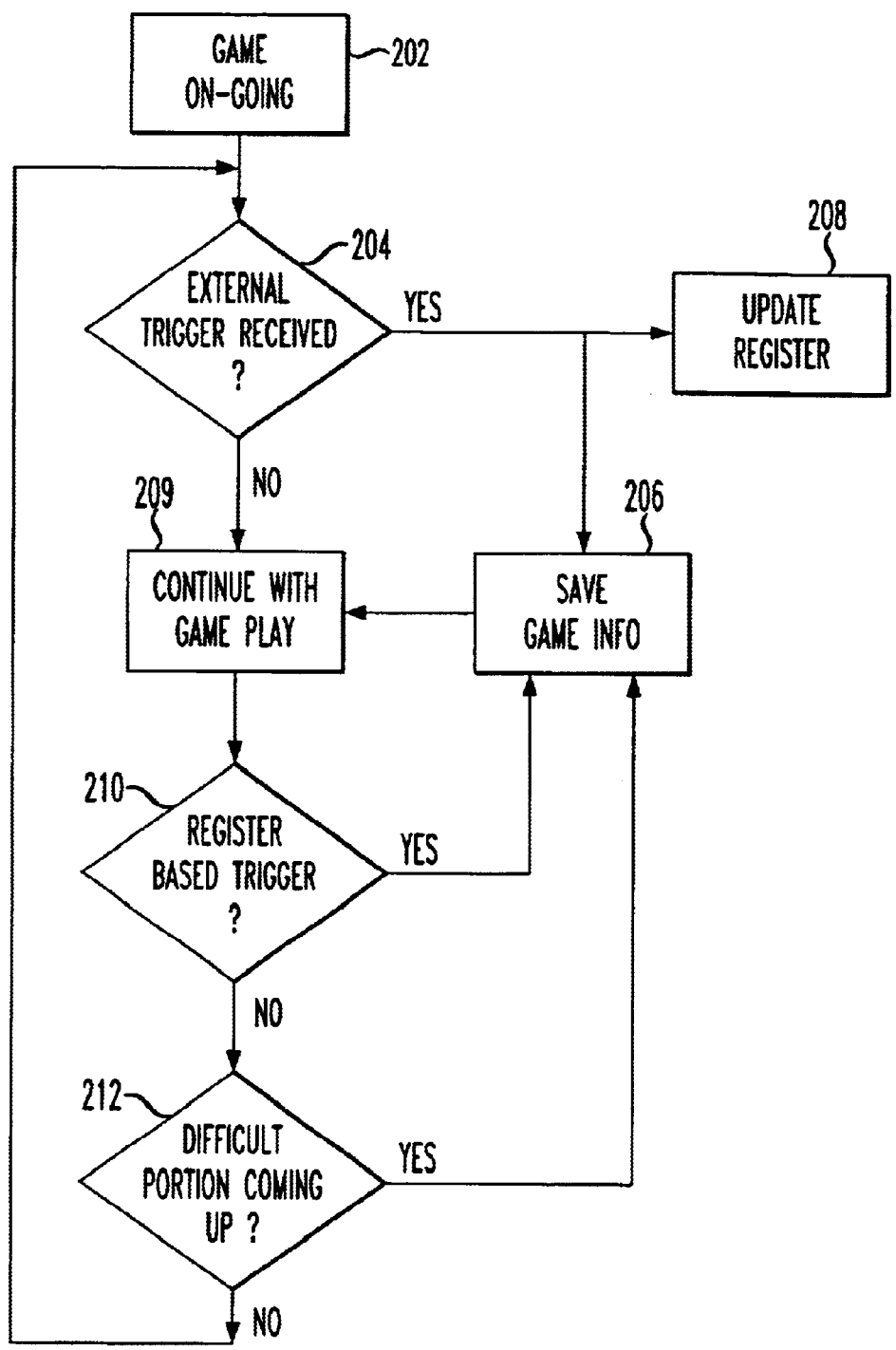

FIG. 2 is a simplified operational flowchart showing an example of the process employed by an embodiment according to the invention, such as that of FIG. 1. This flowchart may, for example, reflect the operations contained in microcode programmed into a processor of game saver unit 113. At step 202, a game experience is initiated and on-going. At step 204, a determination is made as to whether an external trigger has been received from the user input unit 111. This trigger may, for example, be an indication that the user desires to save the game at this point, and wants to continue to play the game. This indication will cause a game save at step 206, which will result, for example, in an update of status information contained within a memory of game saver unit 113. This update may be as simple as an overwrite, or may comprise the saving of one set of game status information in conjunction with a plurality of other previously saved sets, depending, of course, on the capabilities of the memory and the processor.

The external trigger at step 204 may also cause an update to a register or memory at step 208. The memory may be, for example, located within the game control unit 107 or the game saver unit 113, and may be employed, in conjunction with a microprocessor in the control unit 107, to keep track of user initiated game saves in order to adaptively initiate game saves, such as according to a pattern employed by the user. Thus, for example, based on the information stored in the register, after game play is continued at step 209, a register-based trigger at step 210 may be present, in which case a game save operation will again occur.

It should be understood that when the game save operation occurs, it is intended to be transparent to the user, at least in that the game is not disturbed or disrupted. Of course, the user may be provided with an indication that the game save operation has occurred or is occurring, and may also be afforded the opportunity to affect the game save operation, such as by overruling the operation so that it does not occur, but this should have no effect on the actual play of the game.

Continuing with the flowchart of FIG. 2, at step 212 another basis for performing a game save is that a difficult portion of the game is in process, upcoming or imminent. As discussed earlier, the difficult portion may be recognized based on individual user experience, for which experiential data will be stored in the memory. Alternatively, it may be based on general experience, either from a history of users with the particular game and console, in which case a different set of experiential data are stored in the memory, or general population experience, in which case the game saves may be incorporated into the program code.

The operations as described above show various situations wherein a game save operation will occur during the play of the game. For simplicity, the flowchart does not show other operations inherent in playing the game, such as the completion of the game upon reaching a certain goal or upon user initiation, and other operational aspects of the game.

The information saved at the time of a game save may include positional information regarding one or more actors in the game, score information, positional and status information regarding game-related peripherals (e.g., swords, shields, balls, etc., depending on the game) that may also be linked via the wireless piconet, and any other information necessary to reconstruct the game at the point of the save.

Figure 3:
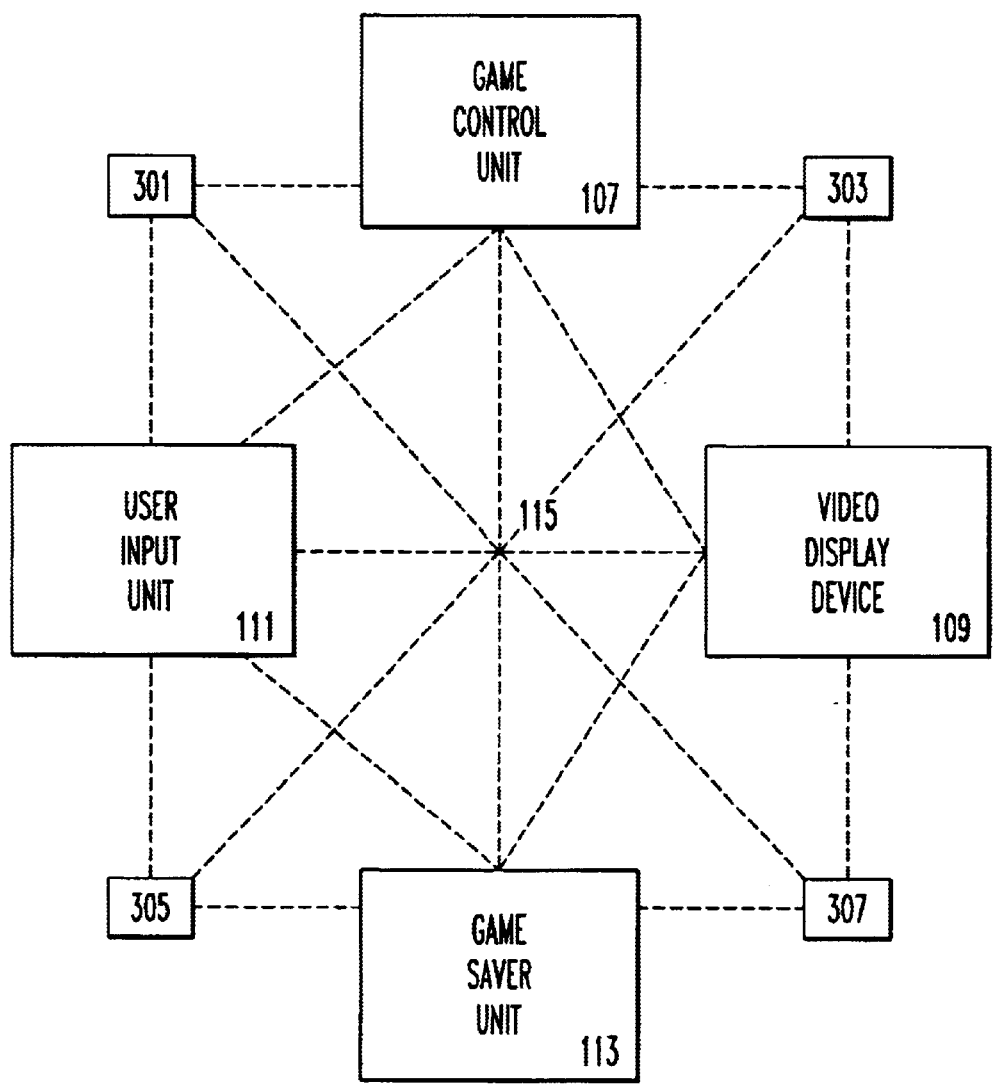

FIG. 3 is a simplified block diagram showing another embodiment according to the invention. Here, in addition to the game control unit 107, video display device 109, user input unit 111 and game saver unit 113, the system also includes a plurality of lighting units 301, 303, 305 and 307 distributed spatially and wirelessly linked to one of the other units. According to this embodiment, the occurrence of a particular event during the play of the game may cause, in addition to or in place of a game save, the illumination of one or more of the lighting units 301, 303, 305 and 307.

For example, the game may be emulating a car race, and the user's car may be passing another car in a difficult turn, wherein the other car crashes into the user's car. This set of circumstances may cause a game save upon the recognition that a crash is likely, imminent, or actually occurring. The same circumstances may also cause the illumination of selected ones of lighting units 301, 303, 305 and 307, such as to simulate the headlights of the car that is passed, for example, at one illumination level, and to simulate the crash, at another illumination level. Of course, the game save may also save information regarding the status of the lighting units.

The lighting units 301, 303, 305 and 307 may also be integrated with corresponding audio speakers, such that the sounds of accelerating, skidding, passing the other car and crashing may be integrated with the illumination of the lighting units 301, 303, 305 and 307. Of course, given the circumstances, the lighting units and/or integrated speakers may be activated at a time when there is no perceived need to perform a game save.

Based on an understanding of these various embodiments, one of skill in the art is likely to conceive of alternative embodiments that are not specifically enumerated here, but that are clearly within the scope of the invention. For example, the simplified flowchart of FIG. 2 shows exemplary points in time when a game save may occur. It is, of course, likely that the actual flow is significantly more complex. For example, prior to saving a game at a particular point, the system may first determine if the set of circumstances presently encountered has already been saved, such as if the user is in the process of learning a particularly difficult portion, and is already on the third or fourth try, in which case there is no need to perform another game save.

What is claimed is:

1. A system, comprising:
    a game control unit;
    a video display device;
    a user input unit; and
    a game saver unit,
    wherein the game saver unit is wirelessly linked to the game control unit, the video display device and the user input unit, and is configured to wirelessly receive and save status information regarding an in-process game on the system.

2. A system as recited in claim 1, wherein the game saver unit saves the status information based on a trigger signal received from at least one of the game control unit, the video display device and the user input unit.

3. A system as recited in claim 1, wherein the game saver unit saves the status information based on an occurrence of a particular event in the game.

4. A system as recited in claim 3, wherein the particular event is the completion of a level within the game.

5. A system as recited in claim 3, wherein the particular event is the imminent occurrence of a difficult portion of the game.

6. A system as recited in claim 5, wherein the difficulty of the portion is determined based on experience for a particular user.

7. A system as recited in claim 5, wherein the difficulty of the portion is determined based on general experience.

8. A system as recited in claim 1, wherein the game control unit is adapted to reinitiate the in-process game based on the status information.

9. A system as recited in claim 1, wherein the game saver unit is adapted to save the status based on a history of a user initiating previous save operations.

10. A system as recite in claim 1, further comprising a plurality of lighting units wirelessly linked to at least one of the game control unit, video display device and user input unit, and adapted to illuminate based on game activity.

11. A method of wirelessly saving a game status of an in-process video game for use with a video game system having a game control unit, a video display and a user input unit, comprising the steps of:

wirelessly linking a game saver unit to the game control unit, the video display and the user input unit of the video game system;

determining that a difficult point in the game is imminent; and saving on the game saver unit the game status received via a wireless link based on the determination.

12. A method as recited in claim 11, wherein the determination that the difficult point in the game is imminent is based on previous plays of the game by a current user.

13. A method as recited in claim 11, wherein the determination that the difficult point in the game is imminent is based on general usage.

14. A method a recited in claim 11, further comprising the step of enabling the user to return to the saved status.

15. A method as recited in claim 14, wherein the return to the saved status is enabled following a particular event within the game.

16. A method as recited in claim 15, wherein the event is a catastrophic event.

\* \* \* \* \*